US010250694B2

(12) United States Patent
Mankovskii et al.

(10) Patent No.: US 10,250,694 B2
(45) Date of Patent: Apr. 2, 2019

(54) MAINTAINING DISTRIBUTED STATE AMONG STATELESS SERVICE CLIENTS

(71) Applicant: CA, Inc., New York, NY (US)

(72) Inventors: Serguei Mankovskii, Morgan Hill, CA (US); Steven L. Greenspan, Scotch Plains, NJ (US); Maria Cecilia Velez Rojas, Santa Clara, CA (US)

(73) Assignee: CA, Inc., New York, NY (US)

( * ) Notice: Subject to any disclaimer, the term of this patent is extended or adjusted under 35 U.S.C. 154(b) by 203 days.

(21) Appl. No.: 15/241,918

(22) Filed: Aug. 19, 2016

(65) Prior Publication Data
US 2018/0054491 A1    Feb. 22, 2018

(51) Int. Cl.
*H04L 29/08* (2006.01)

(52) U.S. Cl.
CPC ............ *H04L 67/142* (2013.01); *H04L 67/02* (2013.01); *H04L 67/10* (2013.01); *H04L 67/22* (2013.01); *H04L 67/2804* (2013.01)

(58) Field of Classification Search
CPC ....... H04L 67/02; H04L 67/025; H04L 67/10; H04L 67/1095; H04L 67/142; H04L 67/2804
See application file for complete search history.

(56) References Cited

U.S. PATENT DOCUMENTS

| | | | | |
|---|---|---|---|---|
| 9,043,706 B2 * | 5/2015 | Nancke-Krogh | ..... | H04L 67/025 709/231 |
| 9,224,259 B1 * | 12/2015 | Miller | ..... | H04L 67/10 |
| 2002/0035604 A1 * | 3/2002 | Cohen | ..... | H04L 67/10 709/205 |
| 2012/0072485 A1 * | 3/2012 | Hutcheson | ..... | H04L 67/14 709/203 |
| 2012/0110570 A1 * | 5/2012 | Jacobson | ..... | G06F 9/45533 718/1 |
| 2013/0066832 A1 * | 3/2013 | Sheehan | ..... | G06Q 10/00 707/634 |
| 2013/0191461 A1 | 7/2013 | Batra | | |

(Continued)

OTHER PUBLICATIONS

Feldman et al., "SPORC: Group Collaboration using Untrusted Cloud Resources", Proceedings of the 9th USENIX Conference on Operating Systems Design and Implementation, 2010, pp. 337-350.*

(Continued)

*Primary Examiner* — Vivek Srivastava
*Assistant Examiner* — William C McBeth
(74) *Attorney, Agent, or Firm* — Gilliam IP PLLC

(57) ABSTRACT

Techniques for managing distributed state for stateless transactions are disclosed herein. In some embodiments a distributed state manager detects a state-changing event that corresponds to a stateless transaction between a node and an application server. The stateless transaction is generated from a first instance of an application that is executing on the node and hosted by the application server. The distributed state manager records the event in a blockchain comprising blocks that each record a batch of one or more events associated with execution of the application. The distributed state manager detects an update to the blockchain associated with the recorded event and modifies a state of a second instance of the application executing on at least one other node based, at least in part, on the update to the blockchain.

20 Claims, 5 Drawing Sheets

(56) References Cited

U.S. PATENT DOCUMENTS

| | | | | |
|---|---|---|---|---|
| 2014/0090084 | A1* | 3/2014 | Goodinson | G06Q 10/101 |
| | | | | 726/28 |
| 2014/0258968 | A1* | 9/2014 | Brown | G06F 17/21 |
| | | | | 717/103 |
| 2014/0302936 | A1* | 10/2014 | Hall | H04L 67/10 |
| | | | | 463/42 |
| 2016/0241676 | A1* | 8/2016 | Armstrong | H04L 67/1095 |
| 2016/0328463 | A1* | 11/2016 | Adoc, Jr. | H04L 67/1095 |
| 2017/0052676 | A1* | 2/2017 | Pulier | G06F 3/04817 |
| 2017/0054790 | A1* | 2/2017 | McCubbin | H04L 67/1095 |
| 2017/0295232 | A1* | 10/2017 | Curtis | H04L 67/1095 |

OTHER PUBLICATIONS

Kraft, "Game Channels for Trustless Off-Chain Interactions in Decentralized Virtual Worlds", Ledger, vol. 1, 2016.*

Nelson et al., "Extending Existing Blockchains with Virtualchain", Workshop on Distributed Cryptocurrencies and Consensus Ledgers (DCCL'16), Jun. 2016.*

Xu et al., "The Blockchain as a Software Connector," 2016 13th Working IEEE/IFIP Conference on Software Architecture, Apr. 5-8, 2016, pp. 182-191.*

Ali et al., "Blockstack: A New Decentralized Internet", Whitepaper, May 16, 2017.*

Schneider, "Implementing Fault-Tolerant Services Using the State Machine Approach—A Tutorial", ACM Computing Surveys, Vo. 22, No. 4 1990, pp. 299-319.*

Crosby, et al., "BlockChain Technology Beyond Bitcoin", University of California Berkeley, Sutardja Center for Entrepreneurship & Technology Technical Report, Oct. 16, 2015, 35 pages, retrieved on Jul. 14, 2016 from http://scet.berkeley.edu/wp-content/uploads/BlockchainPaper.pdf.

Gray, "Introducing Project 'Bletchley'", GitHub, Inc, Azure / azure-blockchain-projects / bletchley / bletchley-whitepaper.md, Jul. 21, 2016, 14 pages, retrieved on Jul. 20, 2016 from https://github.com/Azure/azure-blockchain-projects/blob/master/bletchley/bletchley-whitepaper.md.

Sventek, "The Distributed Application Architecture", University of Glasgow, Jan. 1992, 12 pages, retrieved on Jun. 24, 2016 from http://www.dcs.gla.ac.uk/publications/PAPERS/6750/DAA.pdf.

* cited by examiner

US 10,250,694 B2

MAINTAINING DISTRIBUTED STATE AMONG STATELESS SERVICE CLIENTS

BACKGROUND

The disclosure generally relates to the field of distributed applications, and more particularly to managing a distributed state of stateless client service activity.

Operational architectures supporting machine-to-machine communications are configured in various ways, such as to support Internet-of-Things (IOT) implementations. Web services are an example machine-to-machine architecture that utilizes HTTP to support services, such as processing of application program interface (API) calls between clients and servers. Web services typically utilize a stateless interaction paradigm to simplify client/server interactions required to process API calls. Stateless interaction simplifies many types of interactions but may be a technical liability for cases in which extensive non-deterministic distributed state is inherently present. Coordinated selection of objects among clients performing common tasks in collaborative visualization is an example of a distributed state. Collaborative visualization is employed by "fat client" visualization applications and is difficult to effectively implement, at least in part, due to client coordination issues.

BRIEF DESCRIPTION OF THE DRAWINGS

Aspects of the disclosure may be better understood by referencing the accompanying drawings.

DESCRIPTION

Figure 1:
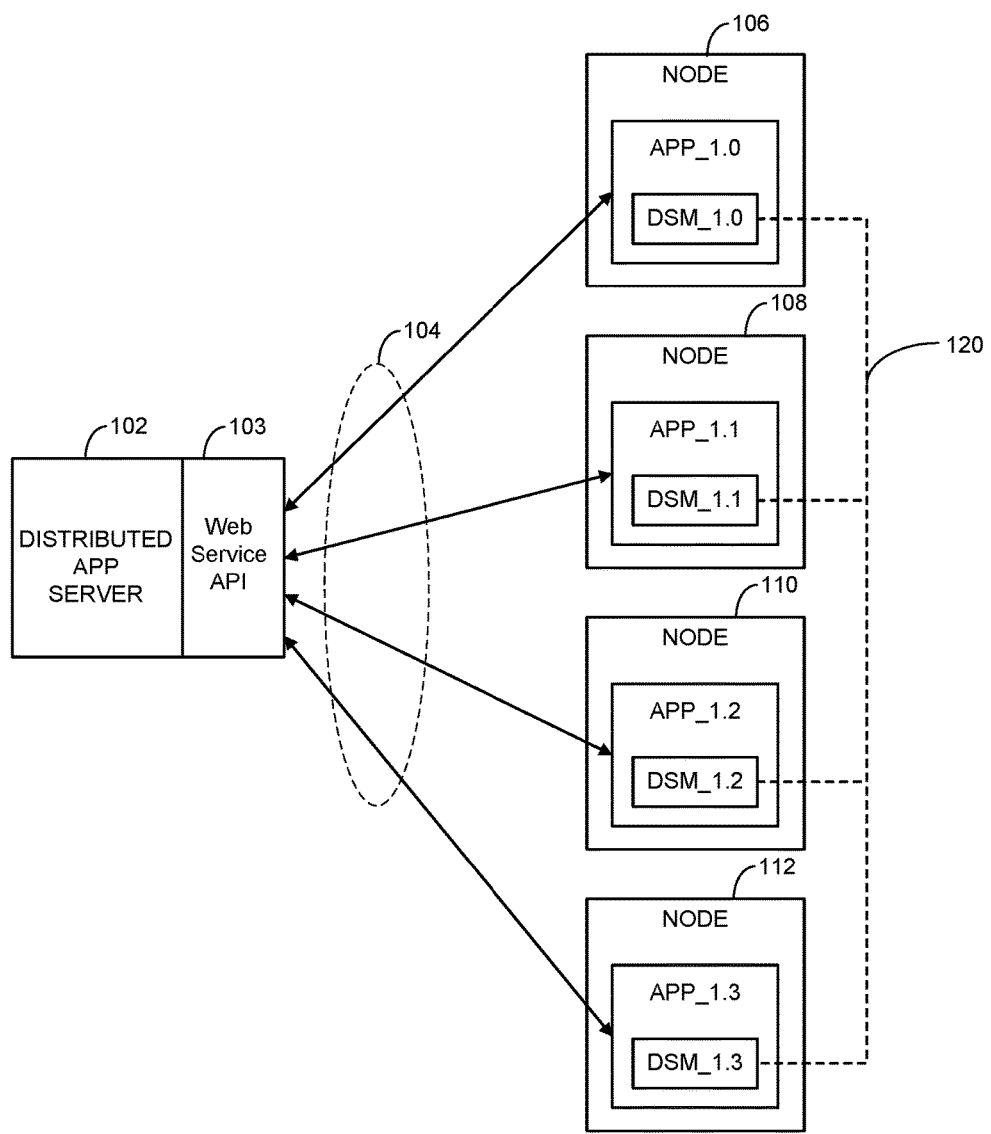
FIG. 1 is a block diagram depicting a distributed application operating environment in accordance with some embodiments.

The description that follows includes example systems, methods, techniques, and program flows that embody aspects of the disclosure. However, it is understood that this disclosure may be practiced without some of these specific details. In other instances, well-known instruction instances, protocols, structures and techniques have not been shown in detail in order not to obfuscate the description.

Overview

Embodiments disclosed herein generally include software and/or hardware components for implementing distributed state management among multiple nodes that execute a distributed application. A distributed application may be generally characterized as application software that executes concurrently on multiple networked computers. Distributed applications are frequently collaborative in nature, executing pursuant to a single purpose. A distributed application may be configured to communicate with multiple server and/or client systems (nodes) on a network. In this manner, a distributed application may spread code and data among the multiple, concurrently operating nodes. Distributed applications may be configured to include server software components and client software. The client software may include browser components that operate in coordination with client application code such as an individual application instance that is loaded into and executed from the client node memory to access data and/or additional code components from the server software running in the server node.

The disclosed embodiments include methods, devices, systems, and program products that implement peer-to-peer (P2P) interaction among web browsers for maintaining distributed state among multiple instances of a distributed application. To this end, a distributed database is configured to track and record events associated with stateless transactions between the nodes. For example the distributed database may be configured to track and record events associated with stateless transaction between client nodes, between server nodes, and/or between a client and a server node. In some embodiments, the client nodes may conduct stateless transactions directly with web or API servers that, in turn, communicate with an application server. A distributed state manager is implemented within each of the nodes, forming a peer network among the nodes for which to manage application state data that is maintained in the distributed database.

In some embodiments, the distributed database is a blockchain into which the distributed state management network records a continuously growing sequential list of transaction records. The records are stored in blocks that may be hardened against tampering by the use of private key encryption. The distributed database may further be configured as a blockchain in which the transaction records comprise distinct data blocks that each contain batches of individual transaction records. Each of the data blocks may further include linkage data that associates the block with an immediately preceding block, and a timestamp corresponding to a point in time at which the block was generated.

In some embodiments, a distributed state manager detects events associated with stateless transactions such as between client nodes and a web or application server. The distributed state manager comprises program code that may be executed from one or more client nodes and/or from an application server that hosts a distributed application. In some embodiments, the clients include web browsers for communicating via a stateless network communication protocol, such as HTTP.

Example Illustrations

FIG. 1 is a block diagram depicting a distributed application operating environment in accordance with some embodiments. As shown in FIG. 1, the operating environment includes a distributed application server 102 that is connected by multiple stateless protocol links 104 to each of client nodes 106, 108, 110, and 112. In an embodiment, distributed application server 102 may comprise an application server back-end and a web server front-end that processes stateless transactions across links 104. Stateless protocol links may be implemented in accordance with a stateless network communication protocol such as Internet Protocol (IP) and the Hypertext Transfer Protocol (HTTP). As utilized herein, "stateless," generally refers to the characteristic of the communication protocol as not retaining any transitional (i.e., state-to-state) information for a given request. In this manner, each request processed in accordance with a stateless protocol is processed entirely independently of any previous requests.

Distributed server 102 includes server side components (not depicted) of a distributed application that includes corresponding client side components, or application instances, in each of the client nodes. For example, client node 106 includes an application instance APP_1.0, node 108 includes an application instance APP_1.1, node 110 includes an application instance APP_1.2, and node 112 includes an application instance APP_1.3. The application instances, APP_1.0, APP_1.1, APP_1.2, and APP_1.3 collectively comprise a distributed application provisioned and hosted by distributed application server 102. In some embodiments, the distributed application may be a collaborative application such as a collaborative visualization application. In such embodiments, distributed application server 102 hosts maintains and modifies a displayed image based on input from each of client nodes 106, 108, 110, and 112 that each receive a copy of the image to be locally displayed.

In some embodiments, application server 102 includes a web service API front end 103 that processes the stateless transaction carried over links 104. In this manner, each of the client nodes may issue HTTP request to access underlying application data (maintained with the hosted application) via web services in the form of RESTful API's, for example. In the case that the application hosted by application server 102 is a collaborative or otherwise distributed application, it would be useful to generate, maintain, and utilize state information to optimally coordinate processing activity among the distributed application instances APP_1.0, APP_1.1, APP_1.2, and APP_1.3. The depicted embodiment utilizes a P2P network 120 that at least partially overlaps the application layer peer network formed by the processing of distributed application instances APP_1.0, APP_1.1, APP_1.2, and APP_1.3 by the client nodes. P2P network 120 comprises a distributed database network that logically interfaces distributed state management components within each of the client nodes.

In FIG. 1, the distributed state management components are depicted as DSM_1.0, DSM_1.1, DSM_1.2, and DSM_1.3 within nodes 106, 108, 110, and 112, respectively. Each of the state management components DSM_1.0, DSM_1.1, DSM_1.2, and DSM_1.3 is configured, using any combination of coded software, firmware, and/or hardware, to implement several functions for generating and updating a distributed database that records event information associated with stateless transactions processed across links 104. To this end, and as described in further detail with reference to FIGS. 2-4, each of the state management components are configured to maintain a local copy/image of the distributed database that contains sequentially ordered blocks/records that specify details of transaction-related events.

One or more of the state management components DSM_1.0, DSM_1.1, DSM_1.2, and DSM_1.3 may be further configured to detect events associated with stateless transactions executed between web service front end 103 and one of the client nodes across one of stateless protocol links 104. Additionally, or in an alternate embodiment, distributed application server 102 may be configured to detect events associated with the stateless transactions. One or more of the state management components configured to detect events may be further configured to broadcast an event message specifying the event to the other current active client nodes. Each of or a designated subset of the client nodes may record one or more of the events in event records within blocks that are added sequentially to the distributed database. As explained in further detail with reference to FIGS. 2-4, the distributed database may comprise a blockchain in which the chronologically ordered blocks containing event records may be utilized for optimally coordinating distributed application processing.

Figure 2:
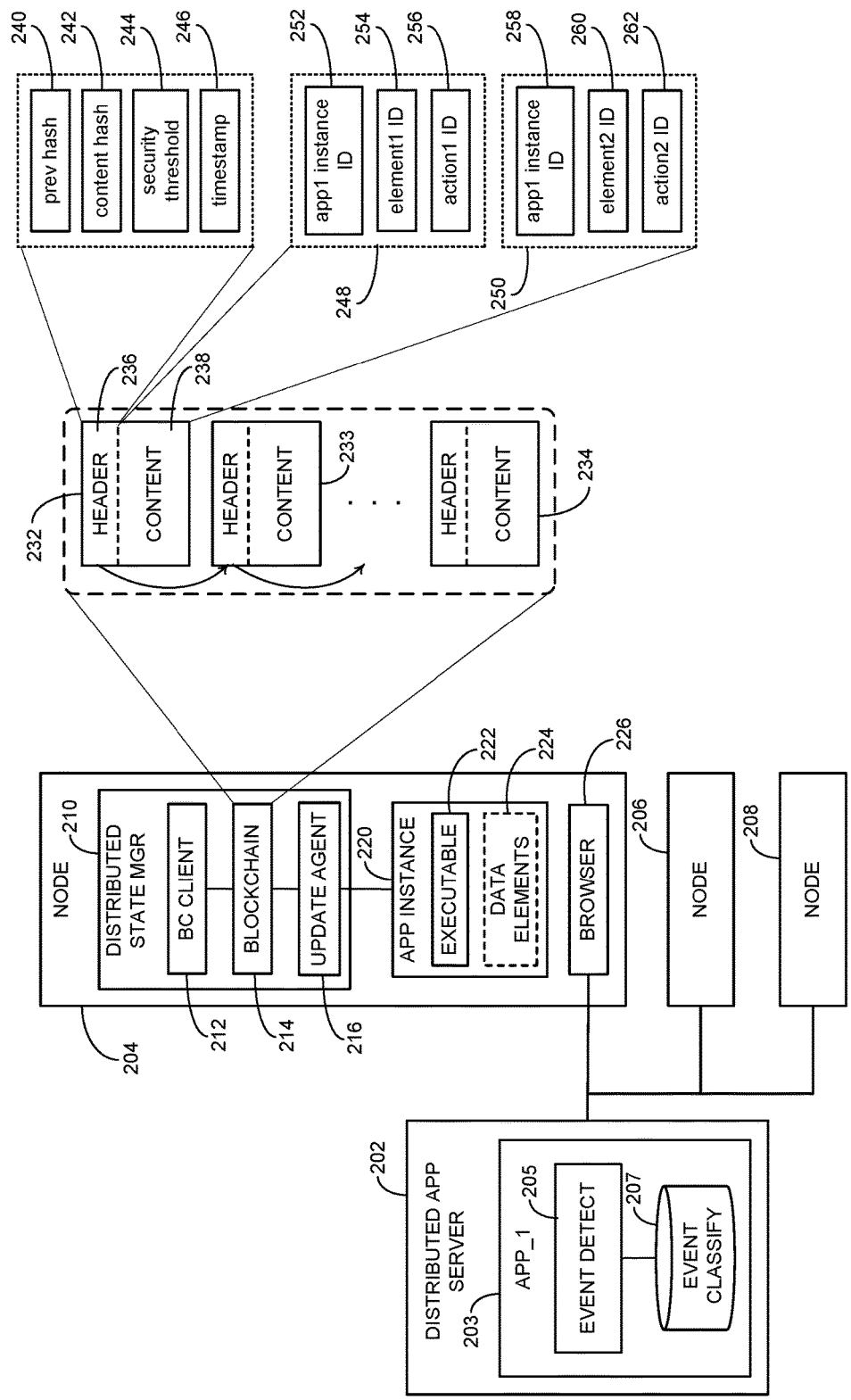
FIG. 2 is a block diagram illustrating systems, devices, and components for implementing distributed state management of a distributed application that interacts with clients via stateless transactions in accordance with some embodiments.

FIG. 2 is a block diagram illustrating systems, devices, and components for implementing distributed state management of a distributed application that interacts with clients via stateless transactions in accordance with some embodiments. As shown in FIG. 2, a distributed application server 202 may be configured similarly to the server 102 depicted in FIG. 1 and include a hosted distributed application 203 and an event detect unit 205. While depicted as incorporated within application 203, event detect unit 205 may be otherwise functionally coordinated with the hosted application (e.g., dynamic linking) in order to perform event detection functions. Event detect unit 205 may also or alternatively be deployed from one or more distributed client application instances as explained below. Event detect unit 205 is configured, using any combination of coded software, firmware, and/or hardware, to detect events associated with stateless transactions conducted between application server 202 and a set of client nodes 204, 206, and 208. The stateless transactions conform to stateless network communication protocols such as HTTP that may carry RESTful object/data element access requests.

In the depicted embodiment, event detect unit 205 may access an event classification library 207 to determine whether a given event modifies the state of one or more instances of the distributed application. In response to detecting a stateless transaction event, one or more records within event classification library 207 may be accessed to determine whether or not the event is "state-changing." For example, data element modification or selection events may be classified as "state-changing" while individual display actions/events (e.g., mouseover input) maybe be classified as non-state-changing. While event detect unit 205 is expressly depicted as deployed by the application host, one or more client instances of the distributed application may also include an event detector and corresponding event classification library or rule-based classification.

Each of client nodes 204, 206, and 208 include an operating instance of host application 203 and other logic components and data for supporting distributed state management in accordance with some embodiments. An example set of internal components of client node 204 is described and depicted as representative of the functional components within others of the client nodes. As shown, client node 204 includes a web browser 226 for executing stateless transactions with application server 202. Client node 204 further includes an application instance 220 comprising executable code 222 and data elements 224. For example, if hosted application 203 is a collaborative visualization application, application instance 220 comprises a front-end application component that enables image data hosted by application 203 to be retrieved, stored, and displayed locally. In addition to displaying hosted data, the code 222 within application instance 220 may enable a client user to access and modify such data 224 (referred to herein as "data elements").

Client node 204 further includes programmatic components that generate and maintain a distributed database in the form of a blockchain that is utilized by any combination of application server 202 and clients 204, 206, and 208 to optimally coordinate distributed application processing. For example, client node 204 includes a distributed state manager 210 that is configured, using any combination of coded software, firmware, and/or hardware, to establish, maintain, and re-establish connectivity with a distributed database in the form of a distributed blockchain. In the depicted embodiment, distributed state manager 210 comprises a local copy 214 of the blockchain that is shared via a P2P network formed among distributed state manager 210 and similar state managers deployed within nodes 206 and 208. The P2P network (distributed state network) is formed among blockchain clients including a blockchain client 212 within distributed state manager 210. Blockchain client 212 is configured, using any combination of coded software, firmware, and/or hardware, to detect events associated with stateless transactions between browser 226 and application server 202 relating to execution of application instance 220. For example, blockchain client 212 may be configured to receive and read application layer requests that are included/embedded within stateless network protocol transaction requests transmitted to application server 202. Having read the request, blockchain client 212 detects an "event" associated with one or more of data elements 224 and may record the event as an event record within a block to be added to blockchain 214. In some embodiments, blockchain client 212 may include an event detector and classification library such as event detector unit 205 and event classification library 203.

As further depicted, blockchain 214 comprises a sequence of multiple blocks that originates with a root block 234, and temporarily ends with block 232. Each block within blockchain 214 includes a header section, HEADER, and a content section, CONTENT. For example, block 232 comprises a header section 236 containing multiple metadata fields and a content section 238 containing multiple payload data fields. As shown by the pointers from one block to another, the header information serves at least in part to connect the blocks in chronological sequence (i.e., sequence based on chronological processing of the application instances within client nodes 204, 206, and 208). For instance, header section 236 comprises a content hash field 242 and a previous hash field 240. Content hash field 242 contains a hash value computed from some or all of the payload data recorded in the content section 238 of block 232. Previous hash field 240 contains a hash value computed from some or all of the payload data recorded in the content section of the immediately previous block 233. In the foregoing manner, blockchain 214 provides an unalterable sequential record that may be utilized as an immutable playback resource for individual events among the distributed application instances.

The distributed state manager 210 (and also for similar distributed state managers deployed within client nodes 206 and 208) may further implement active and passive data and processing security mechanisms. For example, the blockchain client in each of client nodes 204, 206, and 208, may record the content hash and previous hash in an encrypted format such as via asymmetric encryption that utilizes private and public keys. Furthermore, the blockchain clients may be configured to collectively perform consensus approval for establishing and entering any given new block into the blockchain. For instance, the consensus block approval process may entail multiple of the client nodes collecting transaction-associated event information over a collection period and performing encrypted hash computations. The first node to complete the computations correctly, based on consistency with similar computations by other nodes, is authorized to add the new block and records the security threshold criterion (e.g., length of hash) into a security threshold field 244 within header section 236.

Distributed state manager 210 further records a time of record value in a timestamp field 246.

The blockchain clients, such as blockchain client 212 are each further configured to record particular categories of data into multiple fields within the CONTENT section of each block in the blockchain. Referring again to blockchain instance 214, blockchain client 212 reads/parses information identified as events within two different stateless transactions to generate an event record 248 and an event record 250. In this example, a distributed state manager deployed from any of client nodes 204, 206, or 208, or from application server 202 detected two events, each associated with a respective one of two stateless transactions.

The blockchain client (e.g., blockchain client 212) reads/parses the event information (such as by reading/parsing a request issued as part of the stateless transaction) to record event ID information within each of an application instance ID field 252, an element ID field, and an action ID field 256 for event record 248, and within corresponding fields 258, 260, and 262 for event record 250. The blockchain client determines and records an identifier of the particular application instance within fields 252 and 258. The application instance identifier may be a client ID or other identifier by which client nodes within the distributed blockchain network can identify the application instance/client node that is the subject of the event recorded in the block/record. The blockchain client determines and records an element ID within each of element ID fields 254 and 260, with each recorded element ID corresponding to the data element/object that is specified by or within the stateless transactions from which the events were detected. The blockchain client further determines and records an action ID within each of action ID fields 256 and 262. Each of the recorded action IDs specifies a particular action such as "select" or a form of data element modification such as "move to coordinates x, y."

In addition to a blockchain client (e.g., blockchain client 212), each client node includes an update agent such as update agent 216 deployed within/by distributed state manager 210. The blockchain clients within one or more of the client nodes server to generate and maintain an ever-growing, chronologically ordered blockchain containing data element event information. The update agents, such as update agent 216, are each configured, using any combination of coded software, firmware, and/or hardware, to monitor and process blocks within the blockchain to maintain coordination among the distributed application clients.

Figure 3:
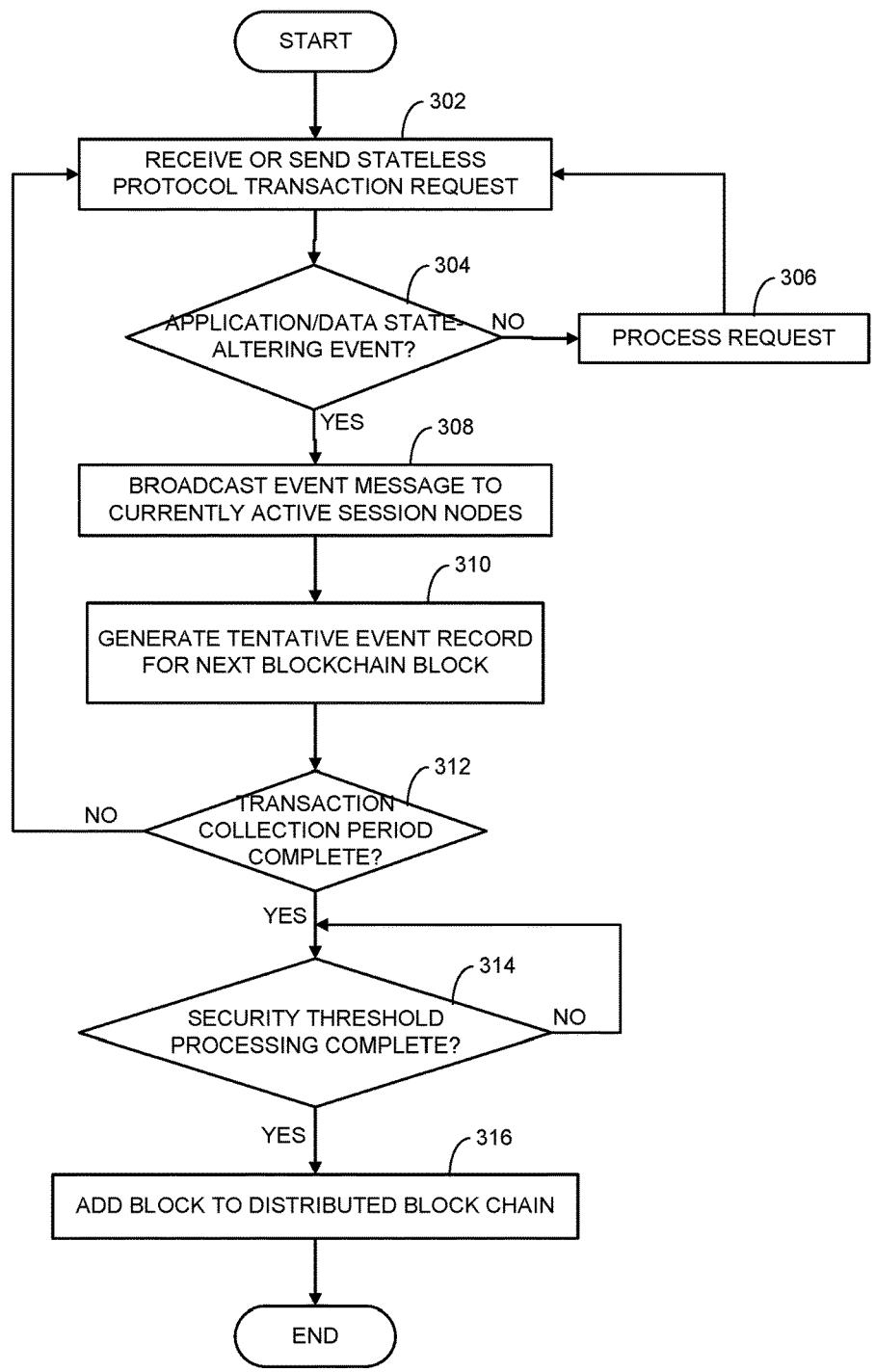
FIG. 3 is a flow diagram depicting operations and functions for managing a distributed state in accordance with some embodiments.

FIG. 3 is a flow diagram depicting operations and functions for managing a distributed state in accordance with some embodiments. The operations and functions depicted and described with reference to FIG. 3 may be performed by one or more of the systems, devices, and programmatic components illustrated and described with reference to FIGS. 1 and 2. For example, one or more of the operations and functions may be performed by various combinations of an application server, an event detector deployed by the application server, client nodes, and/or distributed state managers deployed by client nodes.

The depicted process begins as shown at block 302 with a client node sending or a distributed application server receiving a stateless protocol transaction request. For instance, an event detector deployed in conjunction with a hosted application on a distributed server may detect a transaction request from an application client node requesting selection or modification of a data element. Alternatively, a blockchain client within a distributed state manager may detect generation and/or transmittal of the transaction request. As utilized herein, the unit (server or client side) that receives or otherwise detects/determines the stateless transaction subsequently or simultaneously detects an event associated with the stateless transaction (block 304). For example, if a blockchain client reads a transaction request received by the local application instance via a local browser, the blockchain client may detect the "event" as comprising a object (data element) and an action (e.g., selection or modification performed or to-be-performed on the specified object. In some embodiments, the event detection may utilize either a classification library or a rule-based method to determine whether the event modifies the state of an application instance. For example, in response to identifying the event as a data modification event (e.g., object PUT) the blockchain client determines from one or more classification library records that the event is a state-changing event.

In response to determining that the received or otherwise detected stateless transaction does not qualify as an "event" or that the event is not a state-changing event (e.g., a Read request), the server or client-side agent processes the request as shown at block 306 and control returns to block 302. In response to determining that the received or otherwise detected stateless transaction qualifies as an "event" or as a state-changing event, the server-side or client-side agent may broadcast an event message to the currently active session nodes (block 308). For instance, in response to detecting a state-changing event, a blockchain agent may generate a message that specifies the data element, an action, and an identifier of the client node and/or application instance that is specified by the event via the transaction request. The event message may be broadcast one all or a subset of one or more of the blockchain clients that form the distributed blockchain network.

The process continues at block 310 with one or more of the blockchain agents generating respective event records for respective, tentative versions of the next block to be added to the blockchain. The event records include a specification of the event itself. For example, an event may be recorded as an action (e.g., PUT) and a data element acted on (e.g., object ID). The event records further include metadata associated with context of the events such as the metadata depicted as header data in FIG. 2. In some embodiments, multiple stateless transactions may be processed per blocks 302 through 310 over a specified transaction collection period. If at block 312 the transaction collection period has not expired, control returns to block 302 to repeat the event record generation process for the next blockchain block. When the transaction collection period has expired control passes from block 312 to block 314 with a determination of whether a security threshold criterion has been met or otherwise achieved. For example, if the distributed management system utilizes consensus confirmation, the first of multiple blockchain clients to generate an accurate content hash value of a specified threshold length is approved to add the block to the blockchain as shown at step 316. The block may include metadata in a header section such as the metadata fields depicted in FIG. 2. The block may further include data payload such as the data fields containing a user/client or application instance ID, a data element ID, and an action ID. When a new block is added the blockchain clients of each of the active nodes updates its own local version. In this manner, the collective state maintained by each of the client nodes is updated in relative synchronism.

Figure 4:
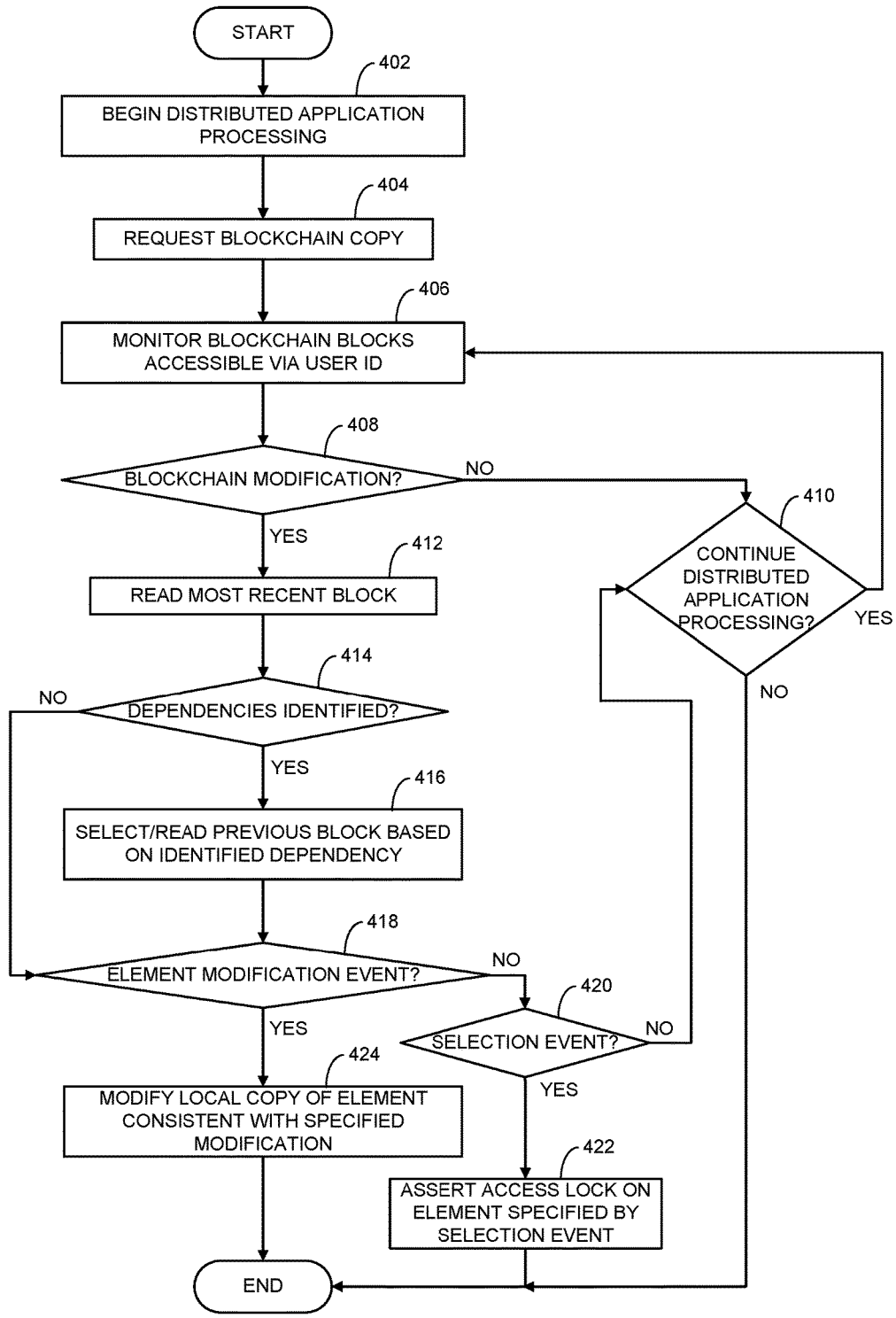
FIG. 4 is a flow diagram illustrating operations and functions for updating distributed application instances based on distributed state in accordance with some embodiments.

In addition to components for generating and building a blockchain to contain application state information, the distributed state management system includes components for processing modifications to the blockchain in order to coordinate distributed application processing. FIG. 4 is a flow diagram illustrating operations and functions for updating distributed application instances based on distributed state maintained and update via a blockchain in accordance with some embodiments. The operations and functions depicted and described with reference to FIG. 4 may be performed by one or more of the systems, devices, and programmatic components illustrated and described with reference to FIGS. 1 and 2. For example, one or more of the operations and functions may be performed by various combinations of an application server, client nodes, and/or distributed state managers deployed by the client nodes. The process begins at block 402 with one or more client nodes communicating with an application server to commence distributed application processing. At block 404 a "new" application client node (e.g., an application client instance that has entered a distributed processing session) requests and receives a copy of the blockchain that is distributed among the current active client nodes.

Continuing at block 406, an update agent within one or more distributed state managers monitors the blockchain to determine if a new block has been added. In some embodiments, the update agent is limited to reading or otherwise accessing blocks based on encryption authorization (different clients may have different access to the set of all blocks based on holding different encryption keys). In response to detecting that a new block has been added for which the host client has access, the update agent reads the event record(s) in the added block (blocks 408 and 412). The new block may include information that directly or indirectly specifies a dependency with one or more previous blocks. If so, the update agent accesses the one or more previous blocks identified as dependent on the newly added block (blocks 414 and 416) and reads the event records contained therein. If no dependencies are found at block 414 or one all dependent blocks have been read, the update agent determine a type of event specified by the one or more of the corresponding event records within the blocks. For example, in response to determining that the event is an element/object modification event (e.g., CREATE or PUT object) performed by a first client application instance, the update agent either directly or indirectly effectuates a corresponding modification to other active application instances (block 418 and 420). For instance, following addition of the new block to the blockchain, each of the update agents in each of the other nodes reads the event modification information in the new block and instructs its respective locally executing application instance to modify its processing (e.g., current display of an object) accordingly. In some embodiments, the distributed state management system may implement a form of data object access lock. As shown at blocks 420 and 422, in response to determining that the event specifies selection of a data element by one of the application instances, the update agents in the other nodes instruct their respective local instances to assert an access lock on the currently accessed data element. Each of one or more of the client nodes may include such update agent monitoring of the distributed blockchain (i.e., multiple individual instances of the blockchain) for the duration of each respective client's continued participation in the distributed application processing (blocks 408, 410, and 406).

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
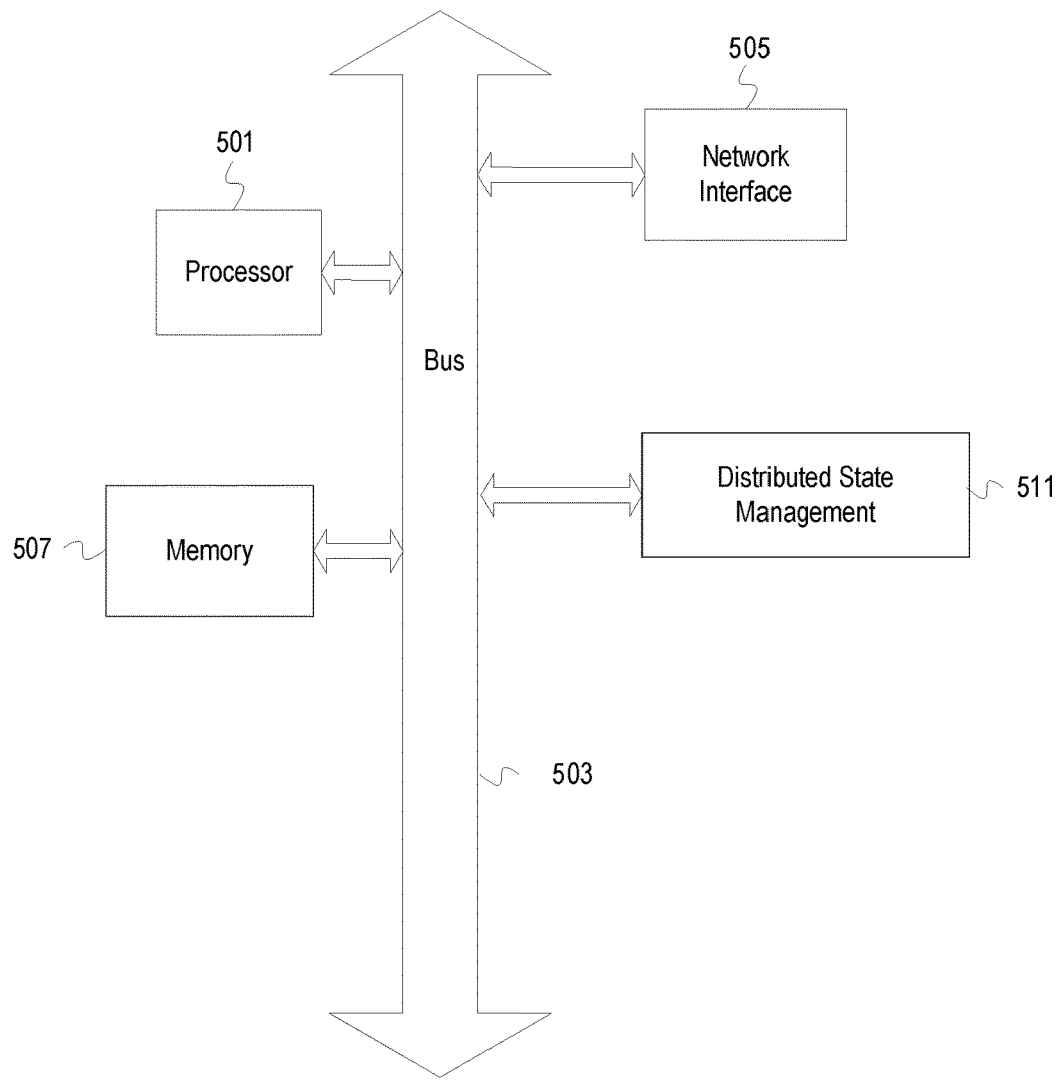
FIG. 5 depicts an example computer system that implements distributed state management in accordance with some embodiments.

FIG. 5 depicts an example computer system that implements distributed state management in accordance with an embodiment. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a distributed state management subsystem 511. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501.

While the aspects of the disclosure are described with reference to various implementations and exploitations, it will be understood that these aspects are illustrative and that the scope of the claims is not limited to them. In general, techniques for generating and maintaining a distributed state for stateless transactions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method for managing distributed state for stateless transactions, said method comprising:
   detecting, by an application server, a first state-changing event that corresponds to a stateless transaction between a first node of a plurality of nodes and the application server, wherein the stateless transaction is generated from a first instance of an application that is executing on the first node, and wherein the application is hosted by the application server;
   broadcasting, by the application server, the first state-changing event to the plurality of nodes;
   initiating, by at least the first node and a second node of the plurality of nodes, generation of a block for entry into a blockchain based, at least in part, on the broadcasted first state-changing event, wherein the blockchain comprises blocks that each record a batch of one or more state-changing events associated with execution of the application;
   adding, by the first node, the block to a locally stored copy of the blockchain on the first node based, at least in part, on the first node completing generation of the block prior to the second node;
   based on detecting that the first node added the block, updating, by each of the plurality of nodes, a locally stored copy of the blockchain with the block generated by the first node to maintain synchronization among the blockchain copies; and
   modifying, by the second node, a state of a second instance of the application executing on the second node based, at least in part, on the update to the locally stored copy of the blockchain.

2. The method of claim 1, wherein the application is a distributed application and wherein the blockchain maintains a chronological sequence of state-changing events processed by multiple instances of the distributed application.

3. The method of claim 1, wherein said adding, by the first node, the block comprises recording metadata indicating context of the first state-changing event within the block.

4. The method of claim 1, wherein said detecting that the first node added the block comprises:
   monitoring, by the plurality of nodes, the blockchain to detect addition of the block to the blockchain; and
   based on detecting the addition of the block, retrieving the block from the first node.

5. The method of claim 1, further comprising:
   determining that the first state-changing event comprises selection of a data element generated by the application; and
   asserting, by at least the second node, an access lock on the data element based, at least in part, on determining that the first state-changing event specifies selection of the data element.

6. The method of claim 1, further comprising determining that the first node has completed generation of the block based, at least in part, on the first node generating a hash sufficient to satisfy a security threshold.

7. The method of claim 1, further comprising:
   determining, by a third node of the plurality of nodes, a type of event indicated in the block added to the blockchain by the first node; and
   based on determining that the type of event is a modification to a data element, modifying a corresponding data element for an instance of the application executing on the third node in accordance with the event indicated in the block.

8. The method of claim 1, wherein the application server does not comprise a copy of the blockchain.

9. One or more non-transitory machine-readable storage media having program code for managing distributed state for stateless transactions, the program code configured to:
   detect, by an application server, a first state-changing event that corresponds to a stateless transaction between a first node of a plurality of nodes and the application server, wherein the stateless transaction is generated from a first instance of an application that is executing on the first node, and wherein the application is hosted by the application server;
   broadcast, by the application server, the first state-changing event to the plurality of nodes;
   initiate, by at least the first node and a second node of the plurality of nodes, generation of a block for entry into a blockchain based, at least in part, on the broadcasted first state-changing event, wherein the blockchain comprises blocks that each record a batch of one or more state-changing events associated with execution of the application;
   add, by the first node, the block to a locally stored copy of the blockchain on the first node based, at least in part, on the first node completing generation of the block prior to the second node;
   based on detecting that the first node added the block, update, by each of the plurality of nodes, a locally stored copy of the blockchain with the block generated by the first node to maintain synchronization among the blockchain copies; and
   modify, by the second node, a state of a second instance of the application executing on the second node based, at least in part, on the update to the locally stored copy of the blockchain.

10. The machine-readable storage media of claim 9, wherein the application is a distributed application and wherein the blockchain maintains a chronological sequence of state-changing events processed by multiple instances of the distributed application.

11. The machine-readable storage media of claim 9, wherein said program code configured to add, by the first node, the block comprises program code configured to record metadata indicating context of the state-changing event within the block.

12. The machine-readable storage media of claim 9, wherein said program code configured to detect that the first node added the block comprises program code configured to:
   monitor, by the plurality of nodes, the blockchain to detect addition of the block to the blockchain; and
   based on detecting the addition of the block, retrieve the block from the first node.

13. The machine-readable storage media of claim 9, further comprising program code configured to:
   determine, by at least the second node, that the first state-changing event comprises selection of a data element generated by the application; and assert, by at least the second node, an access lock on the data element based, at least in part, on determining that the first state-changing event specifies selection of the data element.

14. An apparatus comprising:

a processor; and a machine-readable medium having program code executable by the processor to cause the apparatus to:

detect, by an application server, a first state-changing event that corresponds to a stateless transaction between a first node of the plurality of nodes and the application server, wherein the stateless transaction is generated from a first instance of an application that is executing on the first node, and wherein the application is hosted by the application server;

broadcast, by the application server, the first state-changing event to the plurality of nodes;

initiate, by at least the first node and a second node of the plurality of nodes, generation of a block for entry into a blockchain based, at least in part, on the broadcasted first state-changing event, wherein the blockchain comprises blocks that each record a batch of one or more state-changing events associated with execution of the application;

add, by the first node, the block to a locally stored copy of the blockchain on the first node based, at least in part, on the first node completing generation of the block prior to the second node;

based on detecting that the first node added the block, update, by each of the plurality of nodes, a locally stored copy of the blockchain with the block generated by the first node to maintain synchronization among the blockchain copies; and modify, by the second node, a state of a second instance of the application executing on the second node based, at least in part, on the update to the locally stored copy of the blockchain.

15. The apparatus of claim 14, wherein the application is a distributed application and wherein the blockchain maintains a chronological sequence of state-changing events processed by multiple instances of the distributed application.

16. The apparatus of claim 14, wherein said program code further comprises program code executable by the processor to cause the apparatus to:

monitor, by the plurality of nodes, the blockchain to detect addition of the block to the blockchain; and based on detecting the addition of the block, retrieve the block from the first node.

17. The apparatus of claim 14, wherein the program code further comprises program code executable by the processor to cause the apparatus to:

determine, by the at least the second node, that the first state-changing event comprises selection of a data element generated by the application; and assert, by at least the second node, an access lock on the data element based, at least in part, on determining that the first state-changing event specifies selection of the data element.

18. The apparatus of claim 14, wherein the program code executable by the processor to cause the apparatus to add, by the first node, the block comprises program code executable by the processor to cause the apparatus to record metadata indicating context of the first state-changing event within the block.

19. The apparatus of claim 14, wherein the program code further comprises program code executable by the processor to cause the apparatus to determine that the first node has completed generation of the block based, at least in part, on the first node generating a hash sufficient to satisfy a security threshold.

20. The apparatus of claim 14, wherein the program code further comprises program code executable by the processor to cause the apparatus to:

determine, by a third node of the plurality of nodes, a type of event indicated in the block added to the blockchain by the first node; and based on a determination that the type of event is a modification to a data element, modify a corresponding data element for an instance of the application executing on the third node in accordance with the event indicated in the block.

* * * * *